F. GIESENHAUS.
SALT SHAKER.
APPLICATION FILED JUNE 4, 1914.

1,157,624. Patented Oct. 19, 1915.

Witnesses
Paul M. Hunt
Ross J. Woodward

Inventor
Fred Giesenhaus
By Richard Bower,
Attorney

UNITED STATES PATENT OFFICE.

FRED GIESENHAUS, OF MUSCATINE, IOWA.

SALT-SHAKER.

1,157,624.  Specification of Letters Patent.  Patented Oct. 19, 1915.

Application filed June 4, 1914. Serial No. 843,001.

*To all whom it may concern:*

Be it known that I, FRED GIESENHAUS, a citizen of the United States, residing at Muscatine, in the county of Muscatine and State of Iowa, have invented certain new and useful Improvements in Salt-Shakers, of which the following is a specification.

This invention relates to a condiment holder such as a salt shaker and the principal object of the invention is to provide the salt shaker with an improved type of agitator so that the salt in the shaker will be kept loose and thus prevented from forming into a solid cake.

Another object of the invention is to provide an agitator which is so constructed that it will effectively break up cake salt in case a cake should form in the shaker.

This invention is illustrated in the accompanying drawings, wherein—

Figure 1:
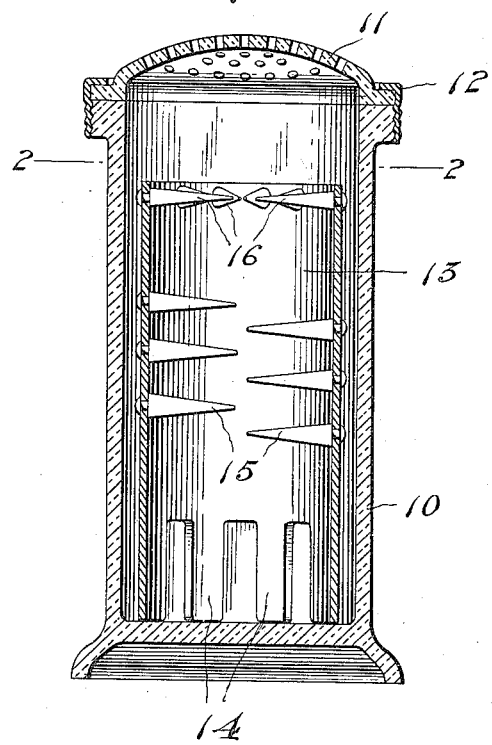
Figure 2:
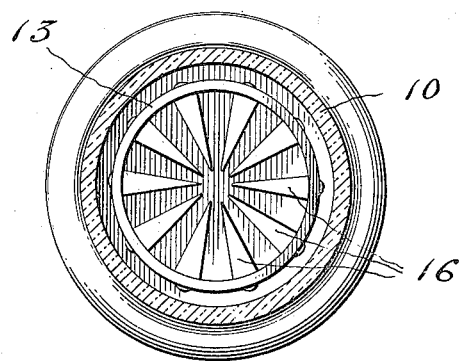

Figure 1 is a vertical sectional view through a shaker provided with the improved agitator; Fig. 2 is a transverse sectional view through the shaker taken along the line 2—2 of Fig. 1.

The shaker 10 is provided with a perforated cover 11 which is movably connected with the shaker by means of the collar 12.

The agitator which is mounted in the shaker 10 comprises a cylindrical body portion or sleeve 13 which has one end portion provided with slots forming tongues or feet 14 which rest upon the bottom of the shaker. These tongues or feet 14 not only support the main portion of the cylinder 13 above the bottom of the disk but also form means for cutting salt in the bottom of the shaker, breaking it in lumps which may form but cannot be reached by the prongs 15 and 16.

The prongs 15 are placed in the cylinder in vertical rows and are arranged in staggered relation as shown in Fig. 1 so that they will serve very effectively to break up a lump of salt which may form within the cylinder.

The prongs 16 are arranged in radiating relation at the end of the cylinder and will serve to break up any lumps which may not have been broken up by the prongs 15 or tongues 14.

When the salt shaker is to be filled the cylinder is first put in place and the salt then poured into the shaker. The cover 11 is then put in place and secured by means of the collar 12. As the shaker is used the cylinder will move longitudinally in the shaker and this will cause the teeth 15 and 16 and tongues 14 to break up any lumps which may form in the shaker. The prongs 15 and 16 will have a tendency to cut the salt and the tongues 14 will have a tendency to pound the lumps of salt thus breaking them up. It will thus be seen that the lumps will be pounded as well as cut and that therefore the salt will be very rapidly broken up and ground to a powder.

What is claimed is:—

1. A salt shaker, a cylinder loosely mounted within said shaker and having its inner end portion cut to form tongues constituting supporting feet and pounding elements, prongs positioned within said cylinder and extending toward the center thereof, and prongs positioned adjacent the outer end of the cylinder and extending in radiating relation.

2. An agitator of the character described comprising a cylindrical body portion having one end portion provided with longitudinally extending slots forming pounding elements, cutting prongs secured within said body portion at a point intermediate its length, and cutting prongs secured within said body portion adjacent its outer end and positioned in radiating relation.

In testimony whereof I affix my signature in presence of two witnesses.

FRED GIESENHAUS.

Witnesses:
A. D. SINCLAIR,
J. G. BARGER.

Copies of this patent may be obtained for five cents each, by addressing the "Commissioner of Patents, Washington, D. C."